United States Patent
Matten et al.

(10) Patent No.: US 6,193,165 B1
(45) Date of Patent: Feb. 27, 2001

(54) FLUID-DISTRIBUTOR FOR A SUBSTANCE-EXCHANGE COLUMN

(75) Inventors: Christian Matten, Munich; Anton Moll, Raisting, both of (DE)

(73) Assignee: Linde Aktiengesellschaft, Wiesbaden (DE)

( * ) Notice: Subject to any disclaimer, the term of this patent is extended or adjusted under 35 U.S.C. 154(b) by 0 days.

(21) Appl. No.: 09/214,045

(22) PCT Filed: Jul. 1, 1997

(86) PCT No.: PCT/EP97/03416

§ 371 Date: Aug. 9, 1999

§ 102(e) Date: Aug. 9, 1999

(87) PCT Pub. No.: WO98/01203

PCT Pub. Date: Jan. 15, 1998

(30) Foreign Application Priority Data

Jul. 4, 1996 (DE) .............................. 196 26 895

(51) Int. Cl.$^7$ .................................................. A62C 2/08
(52) U.S. Cl. .............................. 239/1; 239/450; 239/566; 239/589; 239/548
(58) Field of Search .................................. 239/450, 548, 239/566, 589, 1

(56) References Cited

U.S. PATENT DOCUMENTS

| | | | | |
|---|---|---|---|---|
| 3,419,251 | * | 12/1968 | Eckert | 239/566 X |
| 4,435,891 | * | 3/1984 | Nicholson | 239/566 X |
| 4,557,877 | * | 12/1985 | Hofstetter | 239/450 X |
| 5,501,079 | * | 3/1996 | Kreis et al. | 62/36 |
| 5,597,122 | * | 1/1997 | Eisenmann | 239/589 |
| 5,766,316 | * | 7/1998 | Potthoff et al. | 202/158 |

FOREIGN PATENT DOCUMENTS

| | | |
|---|---|---|
| 0 153 974 | 9/1985 | (EP) . |
| 0 273 191 | 7/1988 | (EP) . |
| 0 607 887 | 7/1994 | (EP) . |
| 2 046 623 | 11/1980 | (GB) . |

* cited by examiner

Primary Examiner—Andres Kashnikow
Assistant Examiner—Robin O. Evans
(74) Attorney, Agent, or Firm—Evenson, McKeown, Edwards & Lenahan, P.L.L.C.

(57) ABSTRACT

The invention concerns a fluid-distributor for a substance-exchange column, the fluid-distributor comprising at least one main duct and a plurality of distributor ducts. The distributor ducts are connected for flow purposes to the main duct and are provided with fluid-discharge openings. In order to attain particularly high-quality distribution, the effective length (L) of the fluid-discharge openings is smaller than their diameter (D).

21 Claims, 3 Drawing Sheets

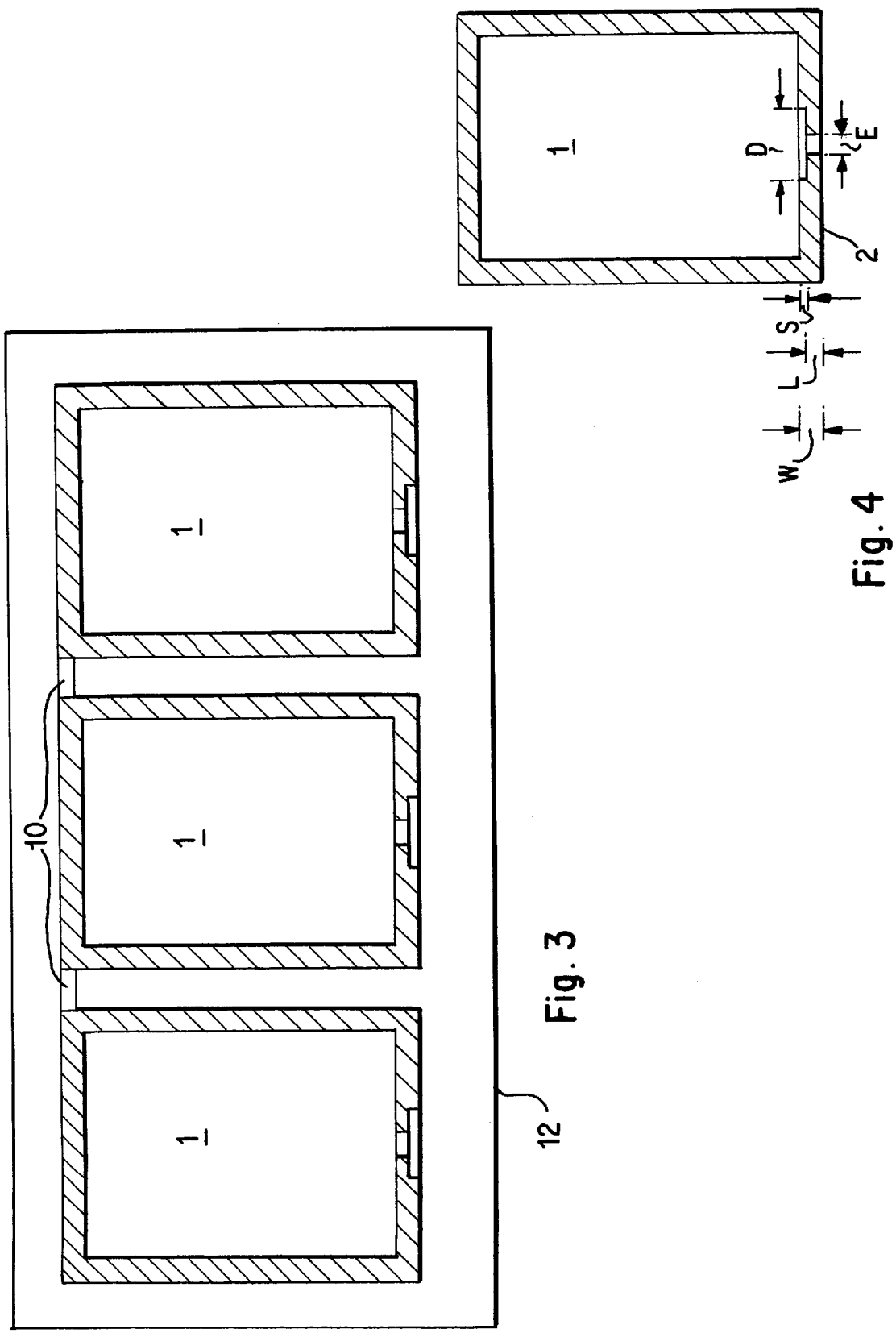

FLUID-DISTRIBUTOR FOR A SUBSTANCE-EXCHANGE COLUMN

BACKGROUND AND SUMMARY OF THE INVENTION

The invention relates to a liquid distributor for a mass-transfer column and to a corresponding method, the liquid distributor having at least one main channel and a multiplicity of distributing channels which are in flow connection with the main channel and are provided with liquid-outlet openings, of which the effective length L is smaller than their diameter D, it being the case that the effective length L is established by that part of the boundary of the outlet opening which is wetted by the liquid during operation of the distributor, and the diameter D denotes the maximum linear extent of the free cross section of the liquid-outlet opening.

Distributors of this type serve for distributing liquid over the cross section of a mass-transfer column, in particular above a section provided with ordered or random packing. They are known, for example, from an article by P. Bomio et al, Chem. Tech. 43rd year, Issue November/December 1991 and are referred to therein as pipe distributors, element distributors or channel distributors. These types of liquid distributors have horizontally aligned distributing channels which are fed by at least one main channel, which usually runs perpendicularly with respect to the distributing channels. In the case of a pipe distributor, the distributing channels are closed on their top side, and in the case of an element or channel distributor they are open at the top. This leads to the problem where the flow in the longitudinal direction of the distributing channels causes a non-uniform distribution of liquid. Depending on the distance between a liquid-outlet opening and the liquid inlet into the distributing channels, said opening has the liquid flowing through it at different outlet speeds.

The object of the invention is therefore to develop a distributor, and a method, of the type mentioned above which allows a particularly high quality of distribution and requires just relatively low production outlay.

As far as equipment is concerned, this object is achieved in that the hole cross section D of the liquid-outlet openings on the inside of the distributing channels differs from the hole cross section E on the outside of the distributing channels.

As far as the method of distributing liquid in a mass-transfer column by means of a liquid distributor is concerned, it being the case that the liquid flows into a multiplicity of distributing channels via a main channel and passes out of liquid-outlet openings located in the distributing channels, it being the case that the liquid wets the liquid-outlet opening over a length which is smaller than the diameter D of the liquid-outlet opening, and it being the case that the diameter D denotes the maximum linear extent of the free cross section of the liquid-outlet opening, this object is achieved in that the liquid wets the liquid-outlet opening over its entire circumference, but not over its entire length.

Diameter here is understood as being the maximum linear extent of the free hole cross section; in the generally customary case of circular liquid-outlet openings, this diameter is the diameter of the circle at the narrowest point of the liquid-outlet opening. The liquid-outlet openings are generally arranged in a horizontally aligned wall section of the distributing channels, with the result that they have the liquid flowing through them essentially in a vertical flow direction.

The effective hole length is established by that part of the hole boundary which is wetted by the liquid during operation of the distributor. For example, in the case of a liquid-outlet opening whose cross section tapers upwards, the effective hole length is smaller than the geometric length. Liquid-outlet openings with this property are also referred to as orifice-plate holes hereinbelow. In the tests carried out within the context of the invention, it has surprisingly been found that the use of such orifice-plate holes results in a considerably improved quality of distribution.

The ratio L/D between the effective length and hole diameter of the liquid-outlet openings is smaller than 1, preferably smaller than or equal to 0.9, smaller than or equal to 0.8, smaller than or equal to 0.7 or smaller than or equal to 0.6.

The effective length of the liquid-outlet openings is preferably smaller than the geometric length thereof. The hole geometry is selected such that the hole length which is wetted by the liquid during operation is smaller than the wall thickness of the distributing channels.

The effective hole length, which is reduced in relation to the geometric hole length, is advantageously achieved in that the hole cross section of the liquid-outlet openings on the inside of the distributing channels is smaller than the hole cross section on the outside of the distributing channels. The liquid-outlet opening may be designed to taper conically from the outside inwards. It is also possible for the cross-sectional surface areas of the hole on the inside and on the outside to be shaped differently, however they are preferably the same, and particularly preferably are both circular. It has been found to be particularly expedient to provide liquid-outlet openings in the form of stepped bores, i.e. one bore running through the entire wall thickness of the distributing channel and a blind hole which is arranged concentrically with respect to said bore and penetrates from the outside just into part of the wall thickness of the distributing channel.

However, it may also be expedient to provide a greater hole cross section of the liquid-outlet openings on the inside of the distributing channels than on the outside of the distributing channels. This variant may provide production-related advantages, in particular, in the case of distributing channels which are open towards the top. The hole geometry is advantageously selected analogously to the variants described above. Stepped bores have been found to be favorable in this configuration as well.

The distributing channels are advantageously closed off at least partially towards the top. So-called pipe distributors in combination with the outlet openings according to the invention are particularly favorable since, even in the case of changes in load, this ensures a high quality of distribution of the liquid. The pipe distributor expediently has a circular or rectangular profile. This means that commercially available pipes or rectangular profiles can be used. Rectangular distributing channels additionally have the advantage that they can easily be fitted on the main channel.

For stability reasons, the wall thickness of the distributing channels is preferably between 1.5 mm and 12 mm, particularly preferably between 2 mm and 6 mm. If, in particular in the case of small hole diameters, the wall thickness exceeds the diameter of the liquid-outlet opening, then the hole geometry is modified such that the effective hole length according to the invention is smaller than the hole diameter.

The diameter of the outlet openings is advantageously from 1 to 10 mm, particularly advantageously from 2 to 6 mm. It has been found that a particularly favorable distribution of the liquid is achieved with this selection of the hole diameter.

From a production point of view, it is favorable to use distributing channels which are produced from extruded profiles or from individual parts which are connected to one another. As a result of their low weight, distributing channels made of plastic or of aluminium are advantageous.

The liquid-outlet openings are preferably arranged in the base of the distributing channels. However, a high quality of distribution is also achieved if the outlet openings are located in the side wall of the distributing channels, particularly advantageously in the bottom third of the side walls.

Moreover, the liquid distributor may have a flow separator which is arranged essentially horizontally within the distributing channels. A flow separator here is understood as being an apparatus by which a medium flowing in one direction (e.g. horizontally) is divided up into two part-streams flowing in different directions (e.g. into a stream which is still horizontal and a stream with a vertical direction component). The flow separator is preferably arranged such that, during operation of the distributor, it is located beneath the surface of the liquid flowing, or static, in the corresponding distributing channel. It causes flow resistance in the vertical direction. This results in two flow cross sections; in the top one the liquid is transported along the distributing channel, and in the bottom one flow takes place merely in the direction of the liquid-outlet opening. The reduction in the horizontal flow speed immediately above the hole brings about a further improvement in the quality of distribution.

The flow separator preferably has a perforated plate. This contains at least one essentially horizontal section. The opening ratio in this region is, for example, 3 to 13%, preferably 5 to 8%, and most preferably approximately 5%.

The invention also relates to a mass-transfer column with a distributor of this type and to the use of such a mass-transfer column for low-temperature separation of air.

BRIEF DESCRIPTION OF THE DRAWINGS

The invention and further details of the invention are explained in more detail hereinbelow with reference to exemplary embodiments illustrated in the drawings, in which:

FIG. 3 shows a cross-sectional schematic view of a plurality of distribution channels in connection with a main channel according to the invention used in a mass transfer column;

FIG. 4 shows a cross-sectional view of a variant of the distributing channel of the first embodiment of the liquid distributor according to the invention;

DETAILED DESCRIPTION OF THE DRAWINGS

Figure 1:
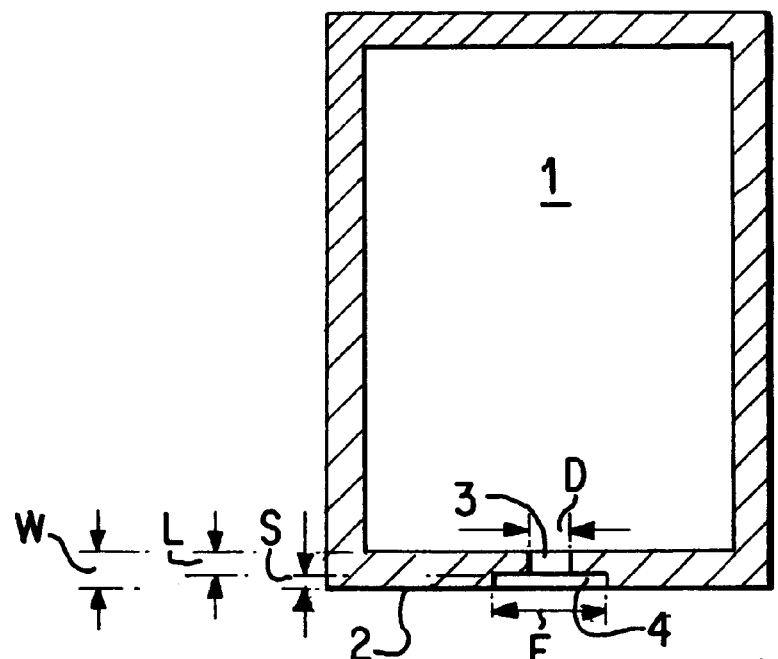
FIG. 1 shows the distributing channel of a first embodiment of the liquid distributor according to the invention, in cross section.

The basic construction of the distributor can be the same for both exemplary embodiments. The corresponding connection between the main channel 10 and distributing channels 1 is shown in EP 0607887 A2 (FIGS. 3 and 4) (corresponding to U.S. Pat. No. 5,501,079). However, the invention may also be used for other basic forms of pipe distributor, element distributor or channel distributor.

The orifice-plate holes may basically be realized in two different ways, namely either by the base of a distributing channel being of a small wall thickness relative to the hole diameter or by the effective hole length being reduced by a change in the hole geometry. The latter is advantageous, in particular, in the case of hole diameters which are small relative to the wall thickness. Both exemplary embodiments relate to the second variant, the geometrical hole cross section on the underside of the base of the distributing channel being greater than that on the top side thereof.

This is easiest achieved, in the case of the production of the distributor, in that first of all an opening 3, which passes through the entire wall thickness w of the base 2 of the distributing channel 1 and of which the cross section establishes the hole diameter D in the sense defined above, is produced—for example by boring or punching. Then a blind hole 4—which is, for example, concentric with said opening—is additionally bored from the underside of the base 2. The blind hole has a greater diameter E and a length s, which is smaller than the wall thickness w. The difference w−s then forms the effective hole length L—which is reduced in relation to the through-opening.

Alternatively, as illustrated in FIG. 4, the hole cross-section D of the liquid-outlet openings on the inside of the distributing channels can be made greater than the hole cross-section E on the outside of the distributing channels.

Figure 2:
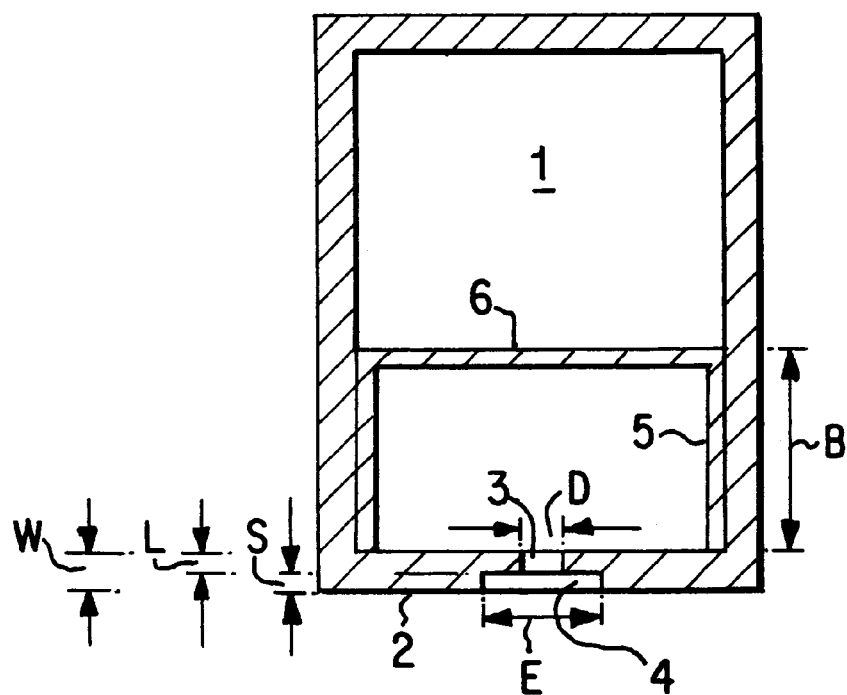
FIG. 2 shows the distributing channel of a further embodiment of the liquid distributor according to the invention, likewise in cross section.

As is illustrated in FIG. 2, the distributing channel may additionally contain a perforated plate 5, with a horizontal section 6, which acts as a flow separator. The distance B between the base 2 and horizontal section 6 is, for example, from 25 to 45%, preferably from 30 to 40%, of the height of the distributing channel. In the actual example given, this value is around 33%.

As schematically illustrated in FIG. 3, it is contemplated that a multiplicity of distributing channels 1 in flow connection with a main channel 10 of the present invention can be used in a mass transfer column 12.

Figure 5:
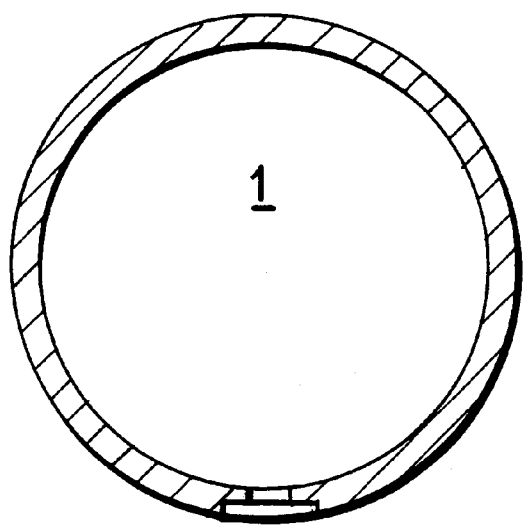
FIG. 5 shows a cross-sectional view of another variant of the distributing channel of the first embodiment of the liquid distributor according to the invention.

As illustrated in FIG. 5, it is contemplated that the distributing channels 1 of the present invention can have a circular cross-section.

Figure 6:
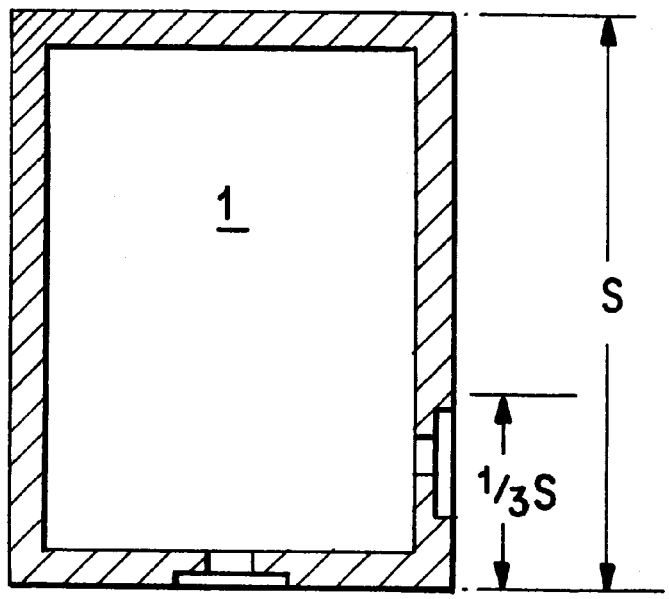
FIG. 6 shows a cross-sectional view of another variant of the distributing channel of the first embodiment of the liquid distributor according to the invention.

As illustrated in FIG. 6, it is contemplated that the distribution channels 1 of the present invention can have liquid-outlet openings in the bottom third of the side walls of the distribution channel 1.

What is claimed is:

1. A liquid distributor for a mass-transfer column, comprising:

at least one main channel;

a multiplicity of distributing channels in flow connection with the main channel, the multiplicity of distributing channels being provided with liquid-outlet openings having an effective length L which is smaller than a diameter D;

wherein the effective length L is established by a boundary portion of the liquid-outlet opening which is wetted by the liquid during operation of the liquid distributor, and wherein the diameter D denotes a maximum linear extent of a free cross-section of the liquid-outlet opening; and further wherein the maximum linear extent of the free cross-section of the liquid-outlet opening on an inside of the distributing channels differs from a hole cross-section E on an outside of the distributing channels.

2. Liquid distributor according to claim 1, wherein the ratio L/D is smaller than or equal to 0.9.

3. Liquid distributor according to claim 1, wherein the ratio L/D is smaller than or equal to 0.8.

4. Liquid distributor according to claim 1, wherein the ratio L/D is smaller than or equal to 0.7.

5. Liquid distributor according to claim 1, wherein the ratio L/D is smaller than or equal to 0.6.

6. Liquid distributor according to claim 1, wherein the hole cross section D of the liquid-outlet openings on the inside of the distributing channels is smaller than the hole cross section E on the outside of the distributing channels.

7. Liquid distributor according to claim 1, wherein the hole cross section D of the liquid-outlet openings on the inside of the distributing channels is greater than the hole cross section E on the outside of the distributing channels.

8. Liquid distributor according to claim 1, wherein the distributing channels are closed off at least partially towards the top.

9. Liquid distributor according to claim 1, wherein the distributing channels have a circular or rectangular cross section.

10. Liquid distributor according to claim 1, wherein a wall thickness w of the distributing channels is between 1.5 and 12 mm.

11. Liquid distributor according to claim 1, wherein a wall thickness w of the distributing channels is between 2 and 6 mm.

12. Liquid distributor according to claim 1, wherein the diameter D of the liquid-outlet openings is from 1 to 10 mm.

13. Liquid distributor according to claim 1, wherein the diameter D of the liquid-outlet openings is from 2 to 6 mm.

14. Liquid distributor according to claim 1, wherein the distributing channels consist of aluminum or plastic.

15. Liquid distributor according to claim 1, wherein the distributing channels comprise extruded profiles or individual parts which are connected to one another.

16. Liquid distributor according to claim 1, wherein the liquid-outlet openings are arranged in the base or in the bottom third of the side walls of the distributing channels.

17. Liquid distributor according to claim 1, wherein a flow separator is arranged essentially horizontally within the distributing channels.

18. Liquid distributor according to claim 17, wherein the flow separator has a perforated plate.

19. Mass-transfer column comprising a distributor according to claim 1.

20. The mass-transfer column according to claim 19, wherein low-temperature separation of air is performed in the mass transfer column.

21. A method of distributing liquid in a mass-transfer column using a liquid distributor, the method comprising the acts of:

flowing the liquid to be distributed into a multiplicity of distributing channels via a main channel and passing the liquid out of liquid-outlet openings located in the distributing channels;

wetting the liquid-outlet openings with the liquid over an effective length of the liquid-outlet openings which is smaller than a diameter D and smaller than a geometric length of the liquid-outlet opening, the diameter D denoting a maximum linear extent of a free cross-section of the liquid-outlet openings; and wherein the wetting act wets the effective length of the liquid-outlet opening over its entire circumference, but not over its entire geometric length.

* * * * *